Dec. 11, 1928.  1,695,165

H. A. WILBERG

SEED PLANTER AND PACKER

Filed June 25, 1926  3 Sheets-Sheet 1

Inventor:
H. A. Wilberg
By Monroe E. Miller
Attorney.

Dec. 11, 1928.

H. A. WILBERG

SEED PLANTER AND PACKER

Filed June 25, 1926  3 Sheets-Sheet 2

1,695,165

Inventor:
H. A. Wilberg
By Monroe E. Miller
Attorney.

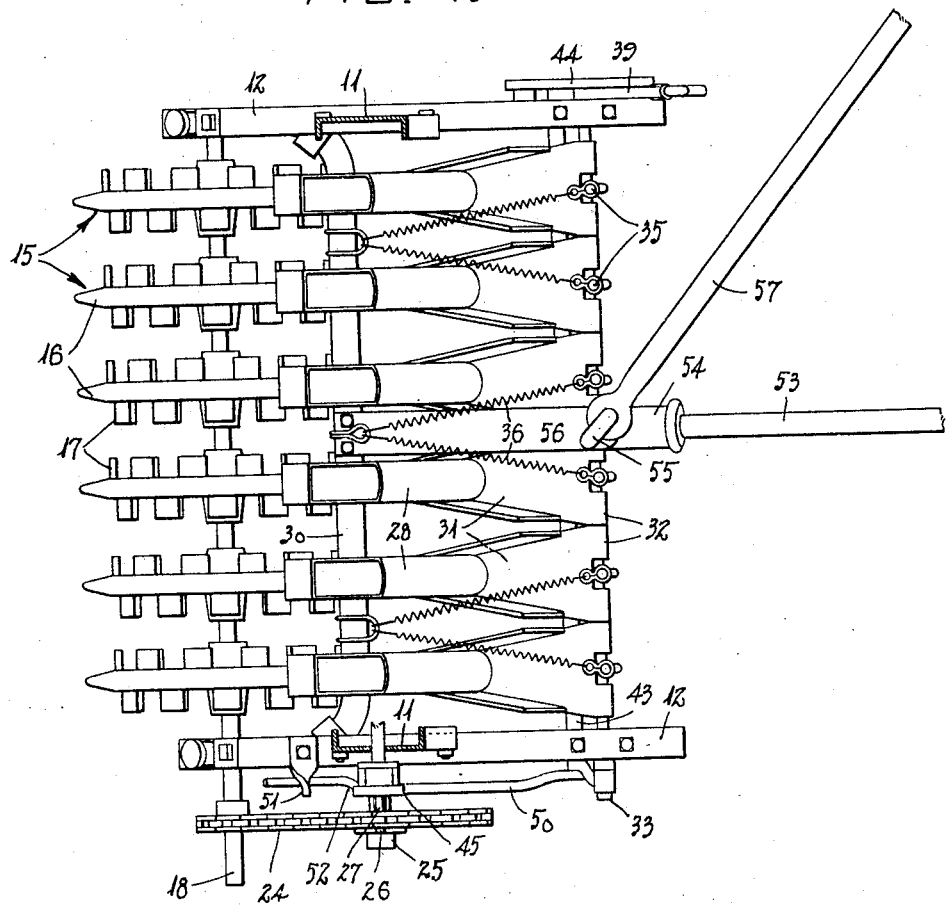

Patented Dec. 11, 1928.

1,695,165

UNITED STATES PATENT OFFICE.

HENRY ADOLPH WILBERG, OF VALLEY CITY, NORTH DAKOTA.

SEED PLANTER AND PACKER.

Application filed June 25, 1926. Serial No. 118,524.

The present invention relates to seed planters and packers, and aims to provide a novel and improved machine of that kind.

One object of the invention is the provision of a seed planter and packer that may be attached to a plow to trail therefrom, and constructed and operable for planting the seed in the moist turned ground and packing the same, in order that the planting of the seed and packing may be done simultaneously with the plowing operation.

Another object is the provision of novel means for depositing the seed in the ground and packing the ground over the seed.

A further object is to provide novel furrow openers and seed depositors which are simple in construction and operation.

A still further object is the provision of novel means for limiting the downward movement of the furrow openers, and for raising same from the ground and simultaneously stopping the discharge of seeds, as when turning the machine around at the ends of the roads or when travelling to or from the field.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Fig. 4 is a fragmentary plan view with the seed hopper and seed droppers broken away.

Figure 1:
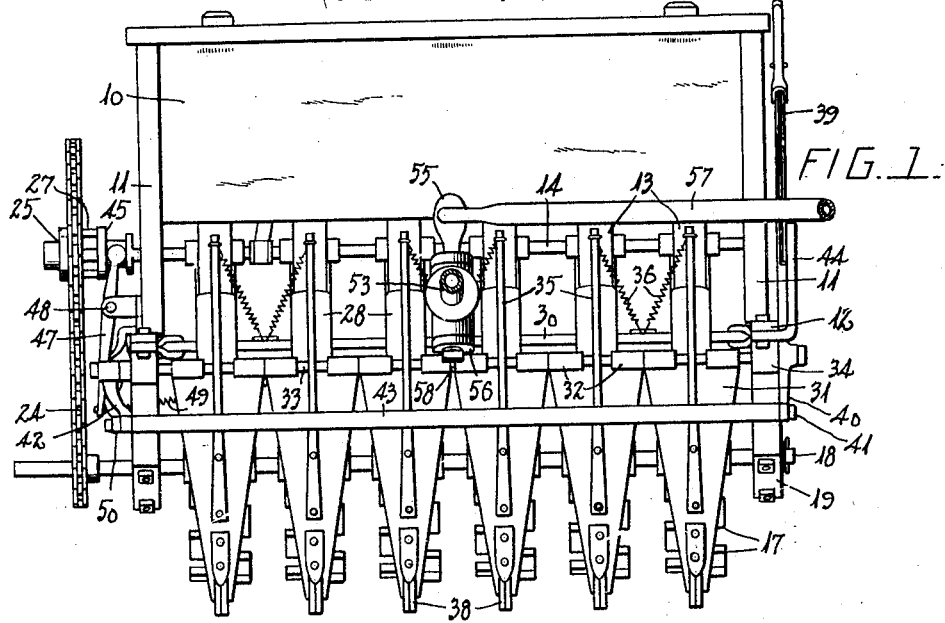
Figure 1 is a front view of the improved seed planter and packer.
Figure 3:
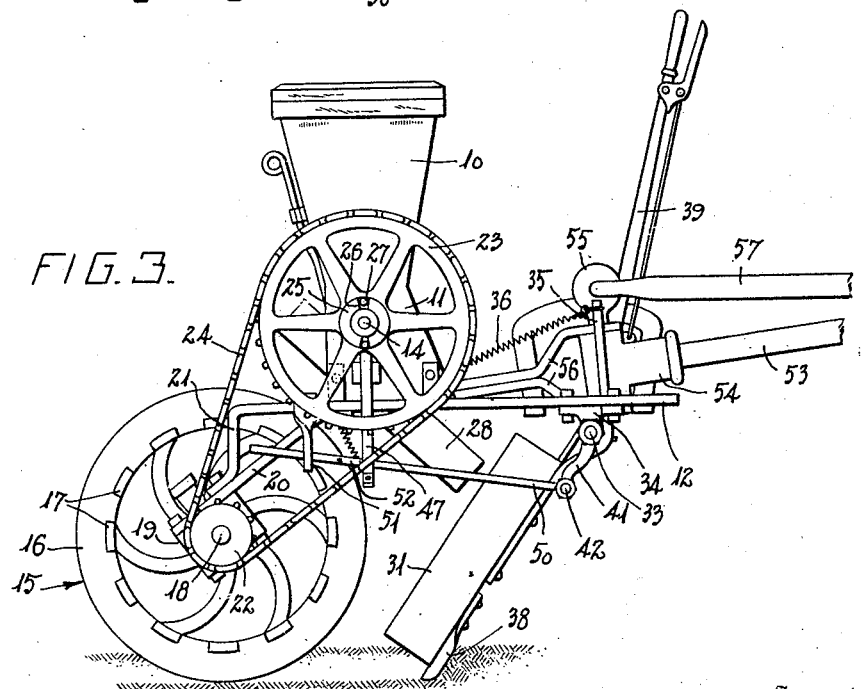
Fig. 3 is a side elevation of the machine.
Figure 2:
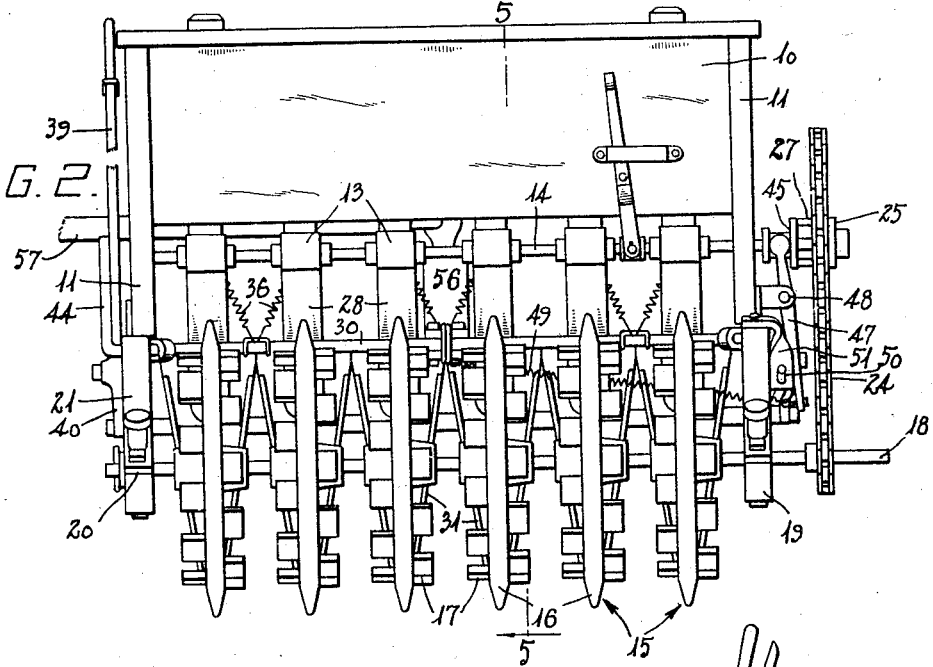
Fig. 2 is a rear view thereof.
Figure 5:
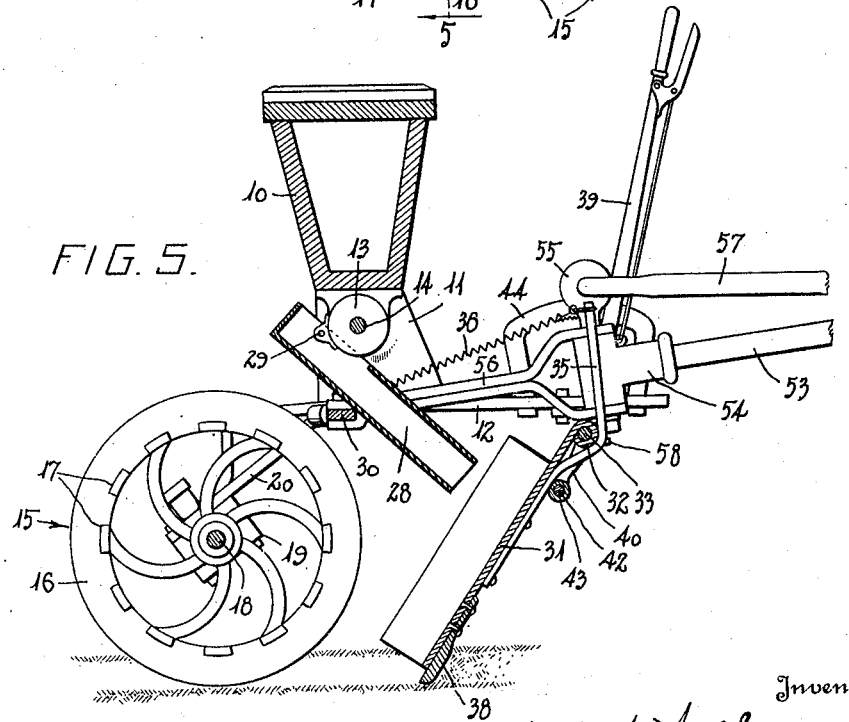
Fig. 5 is a vertical section on the line 5—5 of Fig. 2.

The machine includes a transverse seed hopper 10 having the sides or ends 11 secured on longitudinal frame bars 12 at opposite sides, and the hopper 10 has the seed droppers 13 at the bottom thereof, which seed droppers are of any well known construction, with a shaft 14 extending therethrough for rotating the rotary members of the seed droppers so that the seeds are dropped in the usual manner. The seed droppers are arranged in transversely spaced relation for planting several rows of seeds simultaneously.

The packer section of the machine includes a group of transversely spaced packer wheels 15, one for each seed dropper, and said wheels are disposed in rear of the seed droppers in substantially the same longitudinal vertical planes. Each wheel 15 has a rim 16 of wedge-shaped cross-section, so as to decrease in thickness from the inner to the outer edge of the rim, and the rim is provided adjacent to its inner edge or periphery with outstanding lugs 17 at opposite sides, and in staggered arrangement as shown. The wheels 15 are mounted on a transverse axle shaft 18 which is journaled for rotation in bearings 19 at opposite sides. The bearings 19 are secured to the lower terminals of inclined bars 20 which have their upper forward terminals secured to the bars 12 below the end walls 11 of the hopper 10, and the rear terminals of the bars 12 are bent downwardly, as at 21, and secured to the bars 20, thus providing brackets between the bearings 19 and hopper 10, in order that the hopper and other parts will be supported from the packer.

The seed dropper shaft 14 is actuated by the packer shaft 18, a sprocket wheel 22 being secured on the shaft 18 and an endless sprocket chain 24 passing around the sprocket wheel 22 and a sprocket wheel 23 of larger diameter rotatable on the protruding terminal of the shaft 14. A clutch member 25 is secured on the shaft 14 at the outer side of the sprocket wheel 23 and has notches 26 for receiving clutch pins 27 slidable through the sprocket wheel 23 in the hub thereof.

Chutes 28, which extend forwardly and downwardly, are disposed below the seed droppers 13 to catch the seeds as they are discharged from the droppers and to deliver the seeds forwardly. The chutes 28 are pivotally connected, as at 29, behind the seed droppers 13 and rest on a cross bar 30 secured at its ends to the bars 12.

In front of the chutes 28 are disposed the seed depositors or chutes 31 which normally extend rearwardly and downwardly to drag over the ground. Said chutes or depositors 31 open rearwardly to receive the seeds from the chutes 28 and the chutes 31 decrease in width from their upper to their lower ends, so as to have narrow open lower ends to deposit the seeds into the ground.

The chutes 31 are mounted for upward and downward swinging movement. Thus, the chutes 31 have sleeves 32 at their upper ends embracing a transverse rock shaft 33 journaled in bearings 34 secured to the bars 12 near the forward ends thereof. Upwardly extending arms 35 are secured to the chutes 31 and project above the shaft 33, and coiled tension springs 36 are connected to the arms 35 and bar 30, so as to have a tendency to swing the chutes 31 downwardly.

In order to limit the downward swinging movement of the chutes 31 and to raise same, an upwardly extending hand lever 39 is secured to one end of the rock shaft 33 and has a short arm 40 projecting below said shaft, and a downwardly extending arm 41 is secured to the other end of the shaft 33. A transverse rod 42 is secured to the arms 40 and 41 and is located in front of the chutes 31. A rubber hose or other tubular cushion 43 is preferably disposed on the rod 42 to provide a buffer for the contact of the chutes 31. A rack or segment 44 is secured on the corresponding bar 12 for the engagement of a dog or pawl of any suitable kind carried by the lever 39 for holding the lever in any position to which it is swung. It is apparent that by swinging the lever 39 forwardly, the rod 42 is swung rearwardly and in contacting with the chutes 31 will swing said chutes rearwardly and upwardly, thereby raising the chutes from the ground. By positioning the lever 39 the rod 42 may be positioned to serve as a stop for limiting the downward and forward movement of the chutes 31.

Furrow openers 38 are secured to the lower end portions of the chutes 31 in front thereof, so as to work in the ground and open furrows in the ground below the lower ends of the chutes 31, so that the seeds will drop from said chutes into the furrows immediately behind the furrow openers 38, it being noted that the chutes 31 being swung downwardly and forwardly by the springs 36 will force the furrow openers 38 into the ground, the movement of said furrow openers into the ground being limited by the stop rod 42.

An automatic clutch device is provided for opening and closing the clutch between the sprocket wheel 23 and shaft 14 when the chutes or depositors 31 are raised off the ground and let down on the ground, respectively. Thus, a sleeve or clutch member 45 is rotatable loosely on the shaft 14 between the sprocket wheel 23 and hopper 10, and the clutch pins 27 are secured to said sleeve 45, so that the sleeve 45 rotates with the sprocket wheel 23. When the sleeve 45 is slid inwardly the clutch pins 27 are withdrawn from the notches 26 of the clutch member 25, thereby disconnecting the wheel 23 from the shaft 14 and stopping the seed droppers 13, whereas when the sleeve 45 is slid outwardly the pins 27 will move into the notches 26 thereby rotating the shaft 14 with the sprocket wheel 23 and operating the droppers. A lever 47 is fulcrumed, as at 48, to the corresponding end wall 11 of the hopper, and is connected with the sleeve 45 for moving said sleeve outwardly and inwardly, said lever 27 having a depending arm connected by a coiled retractile spring 49 with the bar 30, to normally swing the lever 47 to close the clutch. A cam rod 50 is pivotally connected at its forward end with the rod 42 and arm 41, and is slidable through a depending guide 51 carried by the corresponding bar 12. The rod 50 has an offset 52, forming a cam at the inner side of the lower arm of the lever 47, whereby when the rod 50 is slid rearwardly by the forward movement of the lever 39, the cam 52 moving past the lever 47 will swing said lever so as to move the sleeve 45 inwardly and open the clutch. When the lever 39 is swung rearwardly so as to move the rod 42 forwardly and release the chutes 31 for downward and forward movement against the ground, the rod 50 is moved forwardly, thereby releasing the lever 47 so that the spring 49 will swing said lever to close the clutch, thereby operating the seed planters 13 when the shaft 18 is rotated by the movement of the packer wheels on the ground.

The machine is intended especially to trail from a plow in order to plant the seed and pack the ground over the seed simultaneously with the plowing operation. Thus, a draft rod 53 extending rearwardly from the plow frame has a T-fitting 54 at its rear end through which an eye bolt 55 extends, and a pair of draft bars 56 are secured at their rear ends to the bar 30 and have their forward terminals offset and engaging the bolt 55 above and below the fitting 54. An oblique brace rod 57 has its rear end engaging the eye at the upper end of the bolt 55 and is connected to the plow frame in any suitable manner. A hook or clip 58 is engaged with the lower terminal of the bolt 55 and is engaged around the shaft 33 for holding the fitting 54 and bars 56 down in place on the shaft 33. The rods 53 and 57 are connected loosely in any suitable manner with the plow frame (not shown) so that the planter trails in rear of the plow.

In operation, as the machine is drawn over the plowed ground, the furrow openers 38 are pressed into the ground by the action of the springs 36 in swinging the chutes 31 downwardly and forwardly, and the seeds which drop into the chutes 28 are discharged forwardly into the chutes 31 and dropped downwardly through the lower ends of said chutes 31 into the furrows. The packer wheels 15 following in rear of the chutes 31 will, by the wedging action of the rims 16 in the ground, and the packing action of the lugs 17, pack the ground over the seeds, thereby planting the seeds and packing the ground, and thereby enabling the seed beds to be prepared even in moist ground simultaneously with the plowing of the ground. When turning the machine around or moving on and off the field, the lever 39 is swung forwardly, so that the chutes 31 are swung rearwardly and upwardly by the rod 42, thereby raising the chutes 31 and furrow openers 38 from the ground, and the rod 50 being moved rearwardly will swing the lever 47 to open the clutch between the sprocket wheel 23 and shaft 14, thereby stopping the dropping of the seeds. When the lever 39 is swung rearwardly to lower the chutes 31 onto the ground, the rod 50 being moved forwardly will release the lever 47 so that the clutch is closed to again operate the seed droppers 13.

Having thus described the invention, what is claimed as new is:—

In a planter, a frame, a transverse rock shaft carried by the frame, transversely spaced chutes mounted loosely on said shaft for swinging movement and extending downwardly and rearwardly to engage the ground, means for delivering seeds to said chutes, individual spring means for said chutes to swing them downwardly, a transverse stop rod carried by said shaft and extending across said chutes in front of same to limit the downward movement of the chutes, and means for turning said shaft to adjust said rod.

In testimony whereof I hereunto affix my signature.

HENRY ADOLPH WILBERG.